(12) United States Patent
Salter et al.

(10) Patent No.: US 11,872,910 B2
(45) Date of Patent: Jan. 16, 2024

(54) VEHICLE SEAT STRUCTURE HANGER BRACKET

(71) Applicant: Ford Global Technologies, LLC, Dearborn, MI (US)

(72) Inventors: Stuart C. Salter, White Lake, MI (US); Adrian Aguirre, Alvaro Obregon (MX); Dustin Shedlarski, Commerce Township, MI (US); Micah Jones, Pleasant Ridge, MI (US); Hussein H. Berry, Dearborn, MI (US); David Brian Glickman, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 9 days.

(21) Appl. No.: 17/572,752

(22) Filed: Jan. 11, 2022

(65) Prior Publication Data
US 2023/0219462 A1    Jul. 13, 2023

(51) Int. Cl.
*B60N 2/01*    (2006.01)
*B60N 2/015*   (2006.01)

(52) U.S. Cl.
CPC .............................. *B60N 2/01508* (2013.01)

(58) Field of Classification Search
CPC .......... B60N 2/005; B60N 2/503; B60N 2/64; B60N 2/3095; B60N 2/01508; B60N 2/01; B60N 2/012
USPC ................ 296/65.01, 65.03, 64, 28; 297/254
See application file for complete search history.

(56) References Cited

U.S. PATENT DOCUMENTS

| | | | | |
|---|---|---|---|---|
| 2,612,207 A | * | 9/1952 | Branson | B60N 2/3095 297/331 |
| 4,602,816 A | | 7/1986 | Chandler | |
| 5,197,381 A | * | 3/1993 | Mells | B60N 2/3097 108/44 |
| 5,215,346 A | * | 6/1993 | Reitzloff | B62D 33/0273 296/65.09 |
| 5,806,906 A | | 9/1998 | Hammond | |
| 6,631,938 B1 | * | 10/2003 | Burns | B60P 3/36 297/14 |
| 7,017,965 B2 | | 3/2006 | Sitzler et al. | |
| 9,776,576 B1 | * | 10/2017 | McDermott | B60P 3/34 |
| 9,896,004 B1 | * | 2/2018 | Kahl | B60N 2/3095 |

(Continued)

FOREIGN PATENT DOCUMENTS

| | | | | |
|---|---|---|---|---|
| DE | 102014215812 A1 | * | 2/2016 | ........ B60N 2/3056 |
| GB | 2521438 A | * | 6/2015 | ........ B60N 2/01508 |

(Continued)

OTHER PUBLICATIONS

JP-2006142979—machine trans (Year: 2006).*
DE-102014215812 machine trans (Year: 2014).*

*Primary Examiner* — Joseph D. Pape
(74) *Attorney, Agent, or Firm* — Vichit Chea; Carlson, Gaskey & Olds, P.C.

(57) ABSTRACT

A stationary vehicle seating system, including: a hanger bracket assembly configured to engage at least one hinge assembly of a stationary vehicle; and a seat structure that hangs from the hanger bracket assembly when the hanger bracket assembly is engaged with the at least one hinge assembly. A seat structure supporting method includes hanging a seat structure from a hanger bracket assembly that is engaged with at least one hinge assembly of a stationary vehicle.

19 Claims, 4 Drawing Sheets

(56) References Cited

U.S. PATENT DOCUMENTS

| | | |
|---|---|---|
| 10,710,487 B2 | 7/2020 | Welch et al. |
| 2017/0120780 A1* | 5/2017 | Jacquemont ............ B60R 22/26 |
| 2020/0290534 A1* | 9/2020 | Hemmelgarn ......... B60N 3/001 |

FOREIGN PATENT DOCUMENTS

| | | | |
|---|---|---|---|
| JP | 2006142979 A | * | 6/2006 |
| KR | 102170790 B1 | | 10/2020 |

* cited by examiner

VEHICLE SEAT STRUCTURE HANGER BRACKET

TECHNICAL FIELD

This disclosure relates generally to a hanger bracket assembly for a stationary vehicle. A seat structure can hang from the hanger bracket assembly.

BACKGROUND

A parked vehicle can provide various seating opportunities. For example, an individual can sit within a cargo area of the parked, stationary vehicle when the individual is camping, or when the individual is tailgating prior to a sporting event or concert.

SUMMARY

In some aspects, the techniques described herein relate to a stationary vehicle seating system, including: a hanger bracket assembly configured to engage at least one hinge assembly of a stationary vehicle; and a seat structure that hangs from the hanger bracket assembly when the hanger bracket assembly is engaged with the at least one hinge assembly.

In some aspects, the techniques described herein relate to a stationary vehicle seating system, wherein the hanger bracket assembly includes at least one hook that hooks on a hinge bracket of the at least one hinge assembly.

In some aspects, the techniques described herein relate to a stationary vehicle seating system, wherein at vertically upper portion of the seat structure is connected to the hanger bracket assembly, wherein a vertically lower portion of the seat structure is connected directly to the stationary vehicle.

In some aspects, the techniques described herein relate to a stationary vehicle seating system, wherein the vertically lower portion is connected to a cargo area floor of the stationary vehicle.

In some aspects, the techniques described herein relate to a stationary vehicle seating system, wherein the hanger bracket assembly includes a bar and a first and second hook extending from a first side of the bar, the first hook configured to engage a first hinge assembly of the stationary vehicle, the second hook configured to engage to a second hinge assembly of the stationary vehicle.

In some aspects, the techniques described herein relate to a stationary vehicle seating system, further including at least one finger of the hanger bracket assembly, the at least one finger is disposed on a second side of the bar that is opposite the first side, the seat structure hanging directly from the at least one finger when the hanger bracket assembly is engaged with the at least one hinge assembly.

In some aspects, the techniques described herein relate to a stationary vehicle seating system, wherein the seat structure is fabric.

In some aspects, the techniques described herein relate to a stationary vehicle seating system, wherein the seat structure has at least one loop, each loop receives the at least one finger when the seat structure is hanging from the hanger bracket assembly.

In some aspects, the techniques described herein relate to a stationary vehicle seating system, wherein the seat structure is a first seat structure and the at least one loop is at least one first seat structure loop, and further including a second seat structure having a least one second seat structure loop, each at least one second seat structure loop receives the at least one finger to hang the second seat structure from the hanger bracket assembly.

In some aspects, the techniques described herein relate to a stationary vehicle seating system, wherein the hanger bracket assembly includes at least one spring-biased clip that grasps the at least one hinge assembly.

In some aspects, the techniques described herein relate to a stationary vehicle seating system, further including a speaker assembly coupled to the hanger bracket assembly.

In some aspects, the techniques described herein relate to a stationary vehicle seating system, further including a heating element of the seat structure.

In some aspects, the techniques described herein relate to a stationary vehicle seating system, wherein the at least one hinge assembly pivotably couples a liftgate to a body of the stationary vehicle.

In some aspects, the techniques described herein relate to a stationary vehicle seating system, wherein the liftgate is a split liftgate.

In some aspects, the techniques described herein relate to a stationary vehicle seating system, wherein the seat structure is a seat back.

In some aspects, the techniques described herein relate to a seat structure supporting method, including: hanging a seat structure from a hanger bracket assembly that is engaged with at least one hinge assembly of a stationary vehicle.

In some aspects, the techniques described herein relate to a seat structure supporting method, wherein a vertically upper portion of the seat structure is connected to the at least one hinge assembly, and a vertically lower portion of the seat structure is connected to a floor of a cargo area of the stationary vehicle.

In some aspects, the techniques described herein relate to a seat structure support method, where the at least one hinge assembly pivotably couples a liftgate to a body of the stationary vehicle.

In some aspects, the techniques described herein relate to a seat structure support method, wherein the liftgate is a split liftgate.

In some aspects, the techniques described herein relate to a seat structure support method, further including receiving a finger of the hanger bracket assembly within a loop of the seat structure to hang the seat structure from the hanger bracket assembly.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
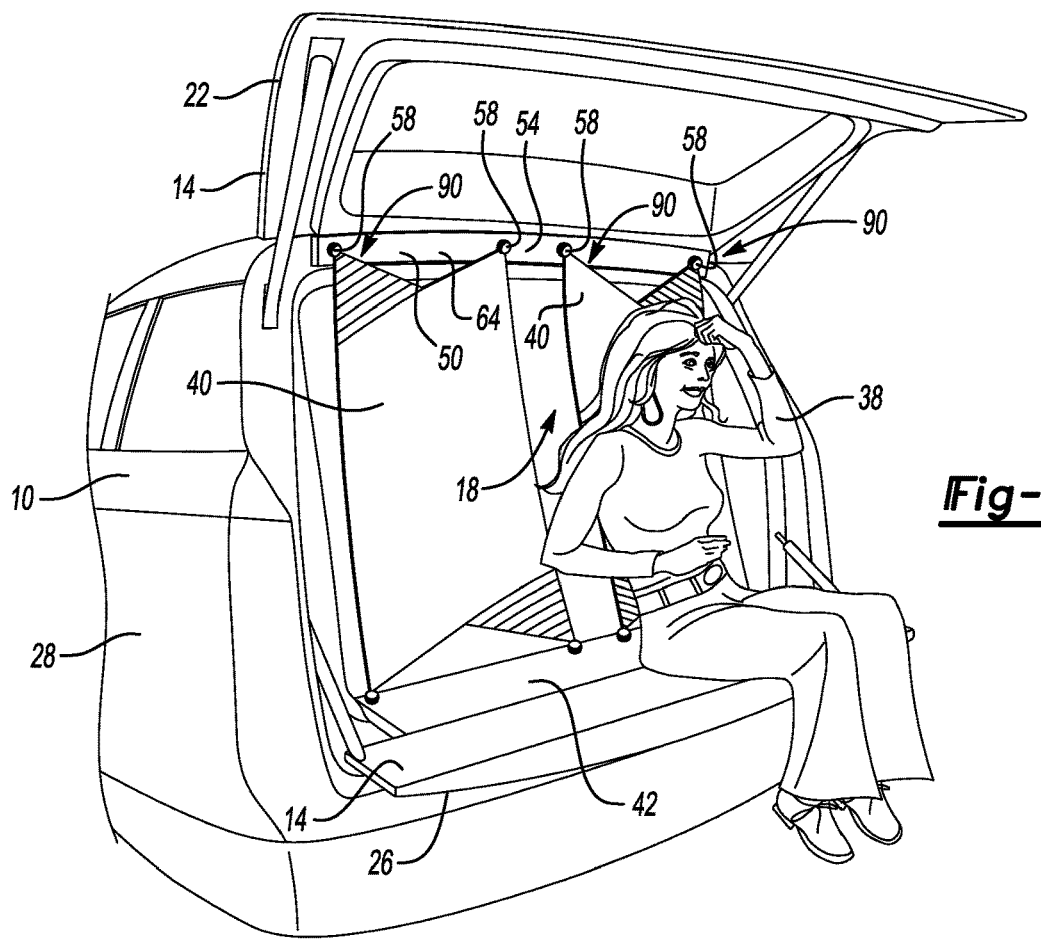
FIG. 1 illustrates a rear perspective view of a stationary vehicle having a split liftgate in an open position and with a user seated on a lower section of the split liftgate and leaning against a seat back hanging from a hanger bracket assembly.
Figure 2:
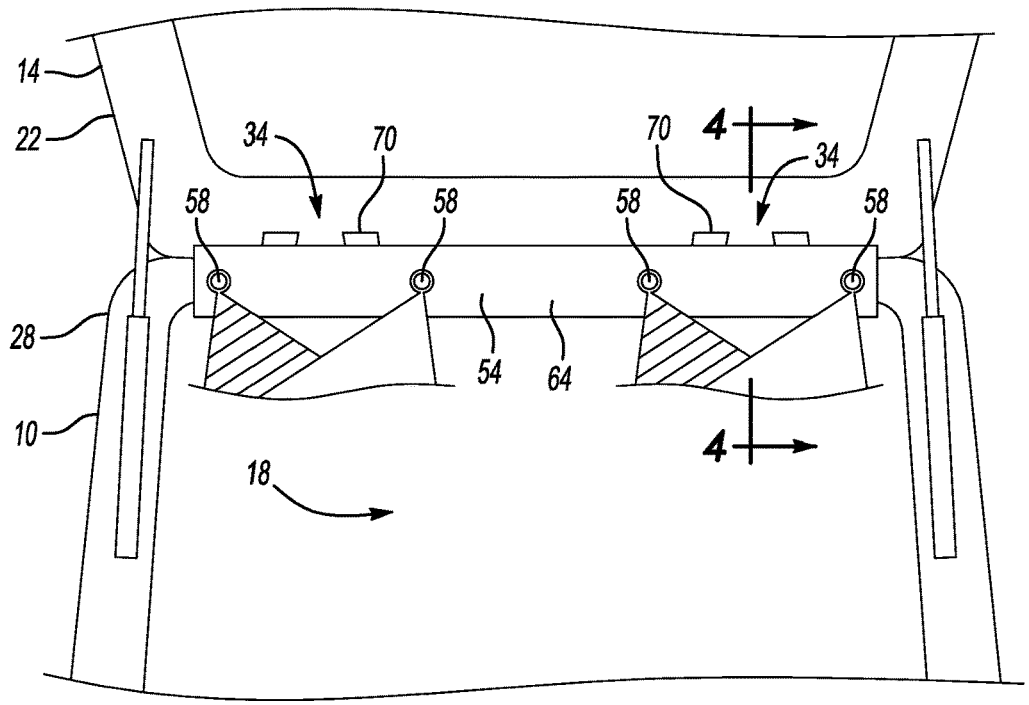
FIG. 2 illustrates a rear view of the stationary vehicle of FIG. 1 without the user or any seat backs.

This disclosure details a stationary vehicle seating system that uses a hanger bracket assembly to provide a hanging location for a seat structure, such as a seat back. The hanger bracket assembly is utilized instead of, for example, hanging the seat back directly from a trim panel of the stationary vehicle. The hanger bracket assembly engages a hinge assembly of the stationary vehicle.

With reference to FIGS. 1-5, a stationary vehicle 10 includes a liftgate assembly 14 that can be opened to provide access to a rear cargo area 18 of the vehicle 10. The liftgate assembly 14 is a type of closure panel assembly. The vehicle 10 can include other types of closure panel assemblies, such as side doors and hoods.

The liftgate assembly 14 is a split liftgate that includes an upper gate 22 and a lower gate 26. The upper gate 22 is pivotably connected to a vehicle body 28 of the vehicle 10 using at least one hinge assembly 34. The lower gate is pivotably connected to the vehicle body 28 through other hinge assemblies (not shown). The upper gate 22 and lower gate 26 can each pivot back and forth between the open position shown and a closed position.

A user 38 can use the lower gate 26 in the open positions as a seat. The user 38 may choose to sit on the lower gate 26 when the user 38 is observing a sporting event or camping.

The user 38 can recline against a seat structure when the user 38 is seated on the lower gate 26. The example seat structure is a seat back 40 or seat sling. The seat structure could be a hammock in another example.

A vertically lower portion of the seat back 40 is connected directly to a cargo area floor 42 of the rear cargo area 18 and is thus connected directly to the vehicle 10. The vertically lower portion could instead, or additionally, connect directly to the lower gate 26. A vertically upper portion of the seat back 40 is connected to a hanger bracket assembly 50 that is engaged with at least one hinge assembly 34. Vertical, for purposes of this disclosure, is with reference to ground and an orientation of the vehicle 10 during ordinary operation.

When not needed, the seat back 40 can be disconnected from the hanger bracket assembly 50 and the floor 42, and then folded up and stored within the vehicle 10. Also, when the seat back 40 is not needed, the hanger bracket assembly 50 can be disengaged from the at least one hinge assembly 34 and stored within the vehicle 10. When the seat back 40 is again desired, the user 38 can perform the steps in a seat back supporting method. The steps include reengaging the hanger bracket assembly 50 with the at least one hinge assembly 34, and then hanging the seat back 40 from the hanger bracket assembly 50.

Figure 3:
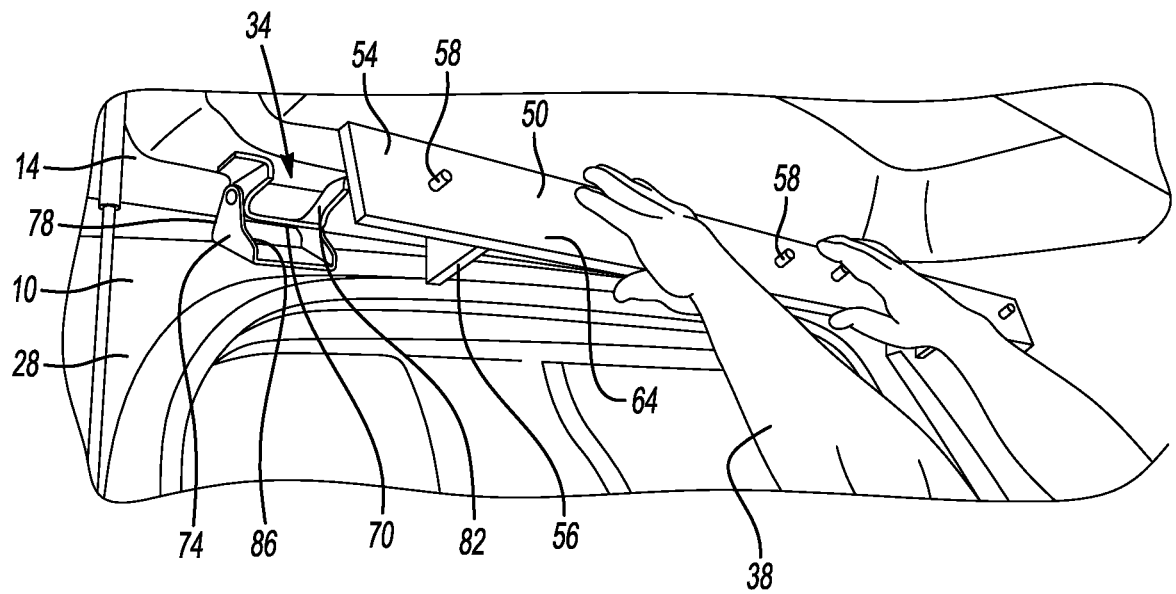
FIG. 3 illustrates a close-up view of an area of the stationary vehicle of FIG. 1 when the hanger bracket assembly is being moved to an engaged position.
Figure 4:
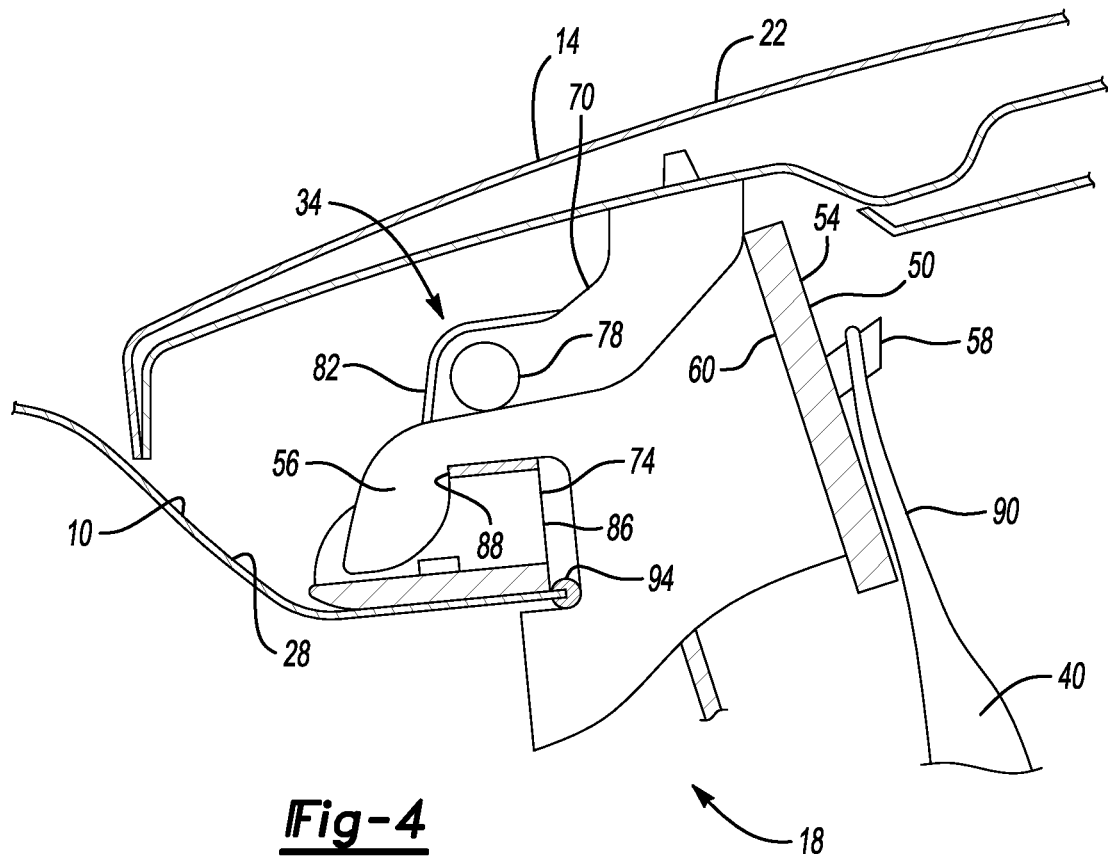
FIG. 4 illustrates a section view taken at line 4-4 in FIG. 2.
Figure 5:
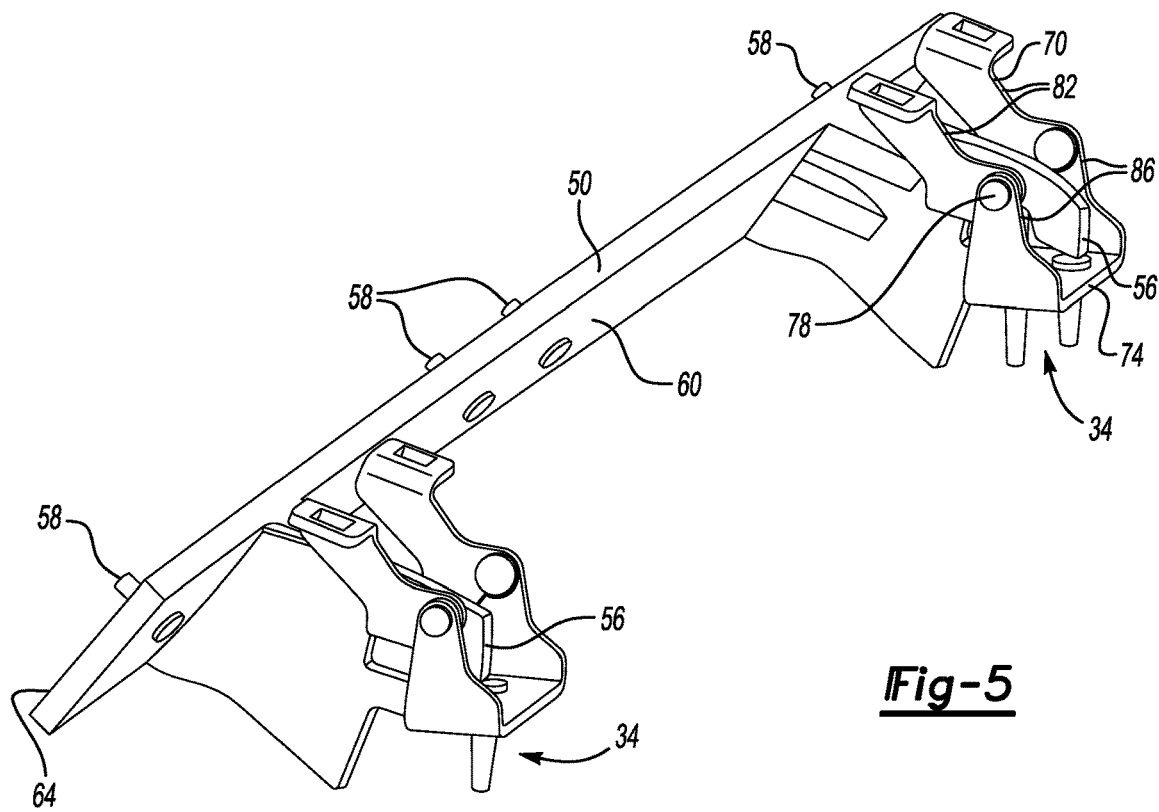
FIG. 5 illustrates a rear perspective view of the hanger bracket assembly in the engaged position with two hinges assemblies.

When the user 38 desires to use the seat back 40 after driving to a location, the user 38 can open the upper gate 22 and the lower gate 26. Next, as shown in FIG. 3, the user 38 can move the hanger bracket assembly 50 from a disengaged position to an engaged position where the hanger bracket assembly 50 is engaged with the at least one hinge assembly 34.

In this example, the at least one hinge assembly 34 is vertically above an opening to the rear cargo area 18. In other examples, the hanger bracket assembly 50 engages hinge assemblies that are in other areas of the vehicle 10, such as hinge assemblies on that are outboard the opening to the rear cargo area 18, or hinge assemblies that pivotably coupled side doors to the vehicle 10.

The hanger bracket assembly 50 includes a bar 54, first and second hooks 56, and at least one finger 58. The first and second hooks 56 extend from a first side 60 of the bar 54. The at least one finger 58 extends from an opposite, second side 64 of the bar 54.

The hanger bracket assembly 50 can be a metal or metal alloy. In another example, the hanger bracket assembly 50 is a reinforced polymer material. The hanger bracket assembly 50 can have blow-molded portions in some examples.

The at least one hinge assembly 34 includes, in this example, a passenger side hinge assembly and a driver side hinge assembly. Each hinge assembly 34 includes two hinge brackets and, more specifically, a gate bracket 70 and a body bracket 74. Each hinge assembly 34 additionally includes pins 78 that pivotably connect together the gate bracket 70 to the body bracket 74.

The gate bracket 70 is generally U-shaped and is fastened directly to the upper gate 22. The body bracket 74 is generally U-shaped and is fastened directly to the vehicle body 28. The pins 78 pivotably connects legs 82 of the gate bracket 70 to legs 86 of the body bracket 74.

In the exemplary embodiment, to transition the hanger bracket assembly 50 to the engaged position, the user 38 inserts the hooks 56 between the legs 86 of the body bracket 74 until the hooks 56 can contact against an inner side 88 of the gate bracket 70. The user 38 can then release the hanger bracket assembly 50, which is supported by the hooks 56 that are hooked to the hinge brackets Next, the user 38 hangs the seat backs 40 from the fingers 58 of the bracket assembly 50. The seat backs 40 in this example, include loops 90 that each receive one of the fingers 58 to connect the vertically upper portions of the seat backs 40 to the hanger bracket assembly 50. The loops 90 allow the seat backs 40 to hang directly from the fingers 58.

The user 38 then connects the vertically lower portion of the seat backs 40 to the floor 42. The seat backs 40 could include loops that connect to hooked features of the floor 42 to connect the vertically lower portions of the seat backs 40 to the floor 42.

The user 38 can then sit on the lower gate 26 and recline against the seat backs 40. The hanger bracket assembly 50 blocks the upper gate 22 from closing.

After the hanger bracket assembly 50 is engaged with the at least one hinge assembly 34, the weight of the hanger bracket assembly 50 helps to keep the hanger bracket assembly 50 engaged. Downward force applied to the fingers 58 can, among other things, tend to drive the bar 54 into a bulb seal 94. The user 38 reclining against one of the seat backs 40 can apply a downward force to the fingers 58. The hooks 56 can touch off against various structures of the vehicle 10 when the downward force is applied. The hanger bracket assembly 50 is thus a self-supporting friction-fit structure.

The seat backs 40, in this example, are fabric. The seat backs 40 could be other materials in other examples. The seat backs 40 could be, for example, leather, vinyl, cloth. The seat backs 40 could be open mesh for breathability.

In some specific examples, the seat backs 40 could be blends of nylons, polyester, rayon, cotton, and/or other wicking fabrics. Materials that are very strong and durable, like Ultra-high-molecular-weight polyethylene thread-knits could also be an alternative. In areas where the seat backs 40 are hung from the hanger bracket assembly 50, the seat backs 40 could incorporate relatively stretchy fabrics, like materials blended or knitted with a small amount of synthetic fibers such as elastane, nylon, etc. Relatively strong and stretchable polyether-based fabrics can be used and are often stretchy and durable.

Figure 6:
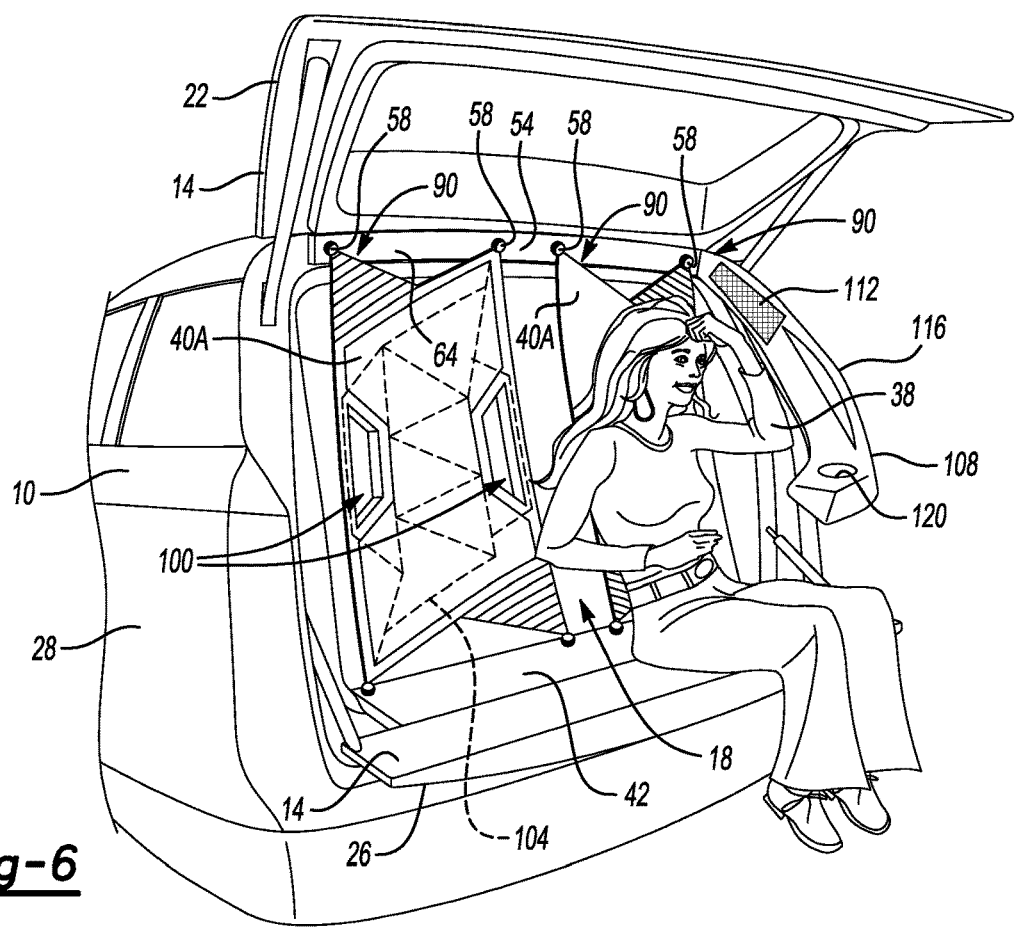
FIG. 6 illustrates the rear perspective view of the stationary vehicle of FIG. 1 showing seat backs according to another exemplary aspect of the present disclosure along with an accessory attached to the hanger bracket assembly.

With reference to FIG. 6, another type of seat back 40A can include bolsters 100 and heating elements 104, which can enhance comfort for the user 38 when reclining against the seat backs 40A. The heating elements 104 can be sewn into the seat backs 40A, for example, and selectively activated to increase thermal energy levels. The heating elements 104 can be powered through a power point of the vehicle 10. In some examples, the seat backs 40A can include a light pipe to help the user 38 see the seat backs 40A.

In the FIG. 6 embodiment, an accessory arm 108 is shown pivotably coupled to the hanger bracket assembly 50. The accessory arm 108 is shown in a user position. For storage purposes, the accessory arm 108 can be pivoted in a direction D so that the accessory arm 108 is aligned parallel to the hanger bracket assembly 50. The accessory arm 108 and the hanger bracket assembly 50 can then be disengaged from the vehicle 10 and stored.

The accessory arm 108 includes a speaker assembly 112, a handle 116 that can assist the user 38 moving to and from a seated position, and a cupholder 120 in this example. The speaker assembly 112 can be powered through a power point of the vehicle 10. The accessory arm 108 could instead or additionally includes lights, charging ports, etc. The accessory arm 108 can communicate wirelessly through BLE communications with the vehicle 10 in some examples. This can facilitate keeping the accessory arm 108 powered even when the vehicle 10 is keyed-off as the communications can command the vehicle 10 to keep the power point powered. The communications can also ensure that the accessory arm 108 does not reduce a state of charge of the vehicle 10 below a threshold level.

Figure 7:
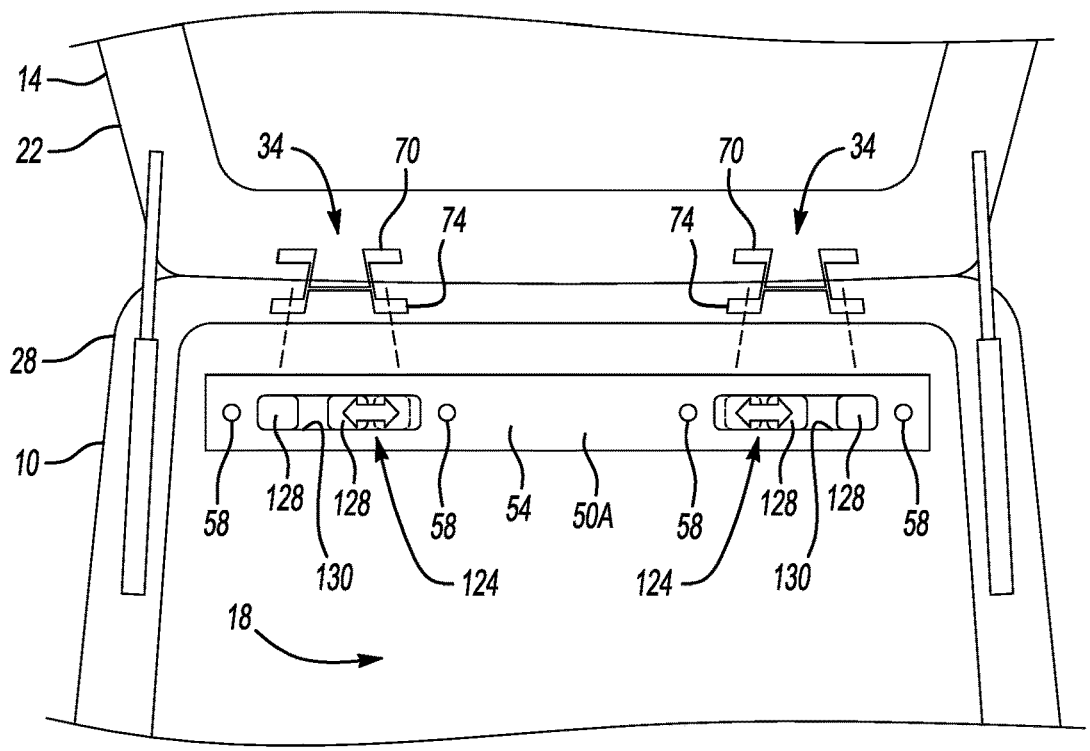
FIG. 7 illustrates a rear view of the stationary vehicle along with a hanger bracket assembly in a disengaged position.
Figure 8:
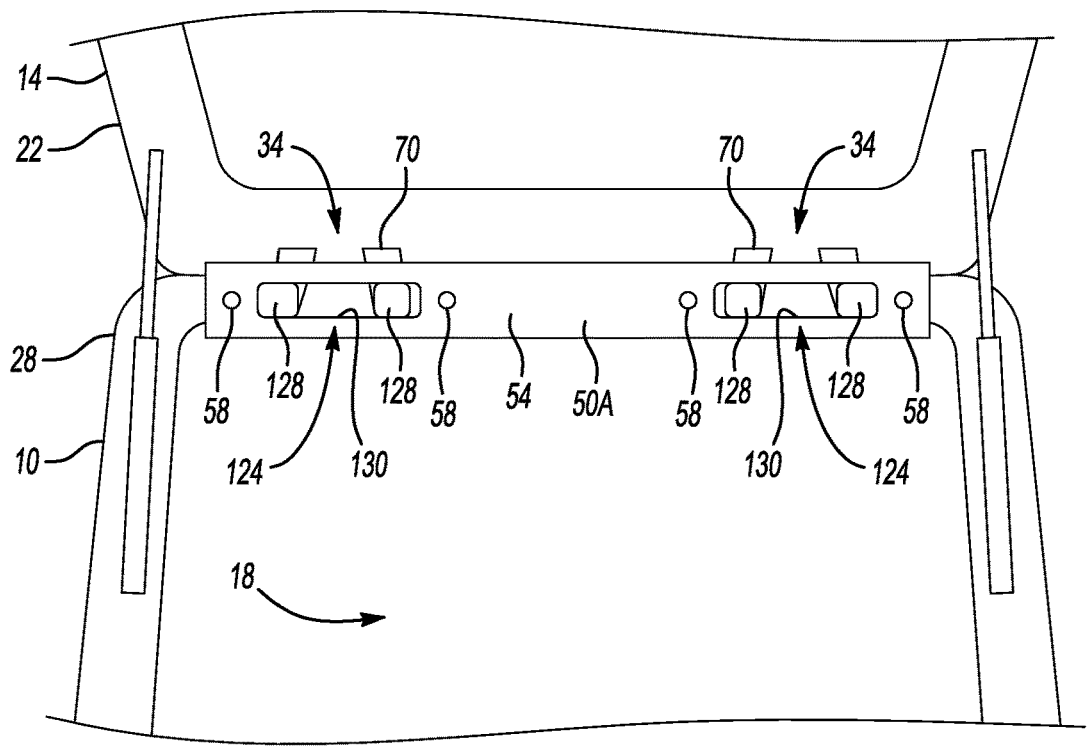
FIG. 8 illustrates the rear view of the FIG. 7 with the hanger bracket assembly in an engaged position.

With reference now to FIGS. 7 and 8, instead of the hooks 56, another variation of the of the hanger bracket assembly 50A relies on clip systems 124 to engage the hanger bracket assembly 50A with the hinge assembly 34. The clip systems 124 each include a pair of clips 128. At least one of the clips 128 in each of the pairs is a spring-biased clip 128 that can slide and is spring-biased toward the other clip 128 of the pair. Each pair of clips 128 can grasp opposing sides the hinge assembly 34 to engage the hanger bracket assembly 50A with the hinge assembly 34. The bar 54 of the hanger bracket assembly 50A can include cutouts 130 to help the user 38 see the hinge assembly 34 through the bar 54 when transitioning the hanger bracket assembly 50A to the engaged position.

Features of the disclosed examples includes supporting a seat structure with a self-supporting friction fit bracket assembly that can be straightforward for a user to engaged and disengage. The bracket assembly can provide an attachment interface for various other accessories.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A seating system, comprising:
a hanger bracket assembly configured to engage at least one hinge assembly of a stationary vehicle;
at least one finger of the hanger bracket assembly, the seat structure hanging directly from the at least one finger when the hanger bracket assembly is engaged with the at least one hinge assembly; and
a seat structure configured to hang from the at least one finger of the hanger bracket assembly when the hanger bracket assembly is engaged with the at least one hinge assembly.

2. The seating system of claim 1, wherein the hanger bracket assembly includes at least one hook that hooks on a hinge bracket of the at least one hinge assembly.

3. The seating system of claim 1, wherein at vertically upper portion of the seat structure is connected to the hanger bracket assembly, wherein a vertically lower portion of the seat structure is connected directly to the stationary vehicle.

4. The seating system of claim 3, wherein the vertically lower portion is connected to a cargo area floor of the stationary vehicle.

5. The seating system of claim 1, wherein the hanger bracket assembly includes a bar and a first and second hook extending from a first side of the bar, the first hook configured to engage a first hinge assembly of the stationary vehicle, the second hook configured to engage to a second hinge assembly of the stationary vehicle.

6. A seating system, comprising:
a hanger bracket assembly configured to engage at least one hinge assembly of a stationary vehicle, the hanger bracket assembly including a bar and a first and second hook extending from a first side of the bar, the first hook configured to engage a first hinge assembly of the stationary vehicle, the second hook configured to engage to a second hinge assembly of the stationary vehicle;
a seat structure that hangs from the hanger bracket assembly when the hanger bracket assembly is engaged with the at least one hinge assembly; and
at least one finger of the hanger bracket assembly, the at least one finger is disposed on a second side of the bar that is opposite the first side, the seat structure hanging directly from the at least one finger when the hanger bracket assembly is engaged with the at least one hinge assembly.

7. The seating system of claim 6, wherein the seat structure is fabric.

8. The seating system of claim 6, wherein the seat structure has at least one loop, each loop receives the at least one finger when the seat structure is hanging from the hanger bracket assembly.

9. The seating system of claim 8, wherein the seat structure is a first seat structure and the at least one loop is at least one first seat structure loop, and further comprising a second seat structure having a least one second seat structure loop, each at least one second seat structure loop receives the at least one finger to hang the second seat structure from the hanger bracket assembly.

10. The seating system of claim 1, wherein the hanger bracket assembly includes at least one spring-biased clip that grasps the at least one hinge assembly.

11. The seating system of claim 1, further comprising a speaker assembly coupled to the hanger bracket assembly.

12. The seating system of claim 1, further comprising a heating element of the seat structure.

13. The seating system of claim 1, wherein the at least one hinge assembly pivotably couples a liftgate to a body of the stationary vehicle.

14. The seating system of claim 13, wherein the liftgate is a split liftgate.

15. The seating system of claim 1, wherein the seat structure is a seat back.

16. A seat structure supporting method, comprising:
hanging a seat structure from a hanger bracket assembly that is engaged with at least one hinge assembly of a stationary vehicle; and
receiving a finger of the hanger bracket assembly within a loop of the seat structure to hang the seat structure from the hanger bracket assembly.

17. The seat structure supporting method of claim 16, wherein a vertically upper portion of the seat structure is connected to the at least one hinge assembly, and a vertically lower portion of the seat structure is connected to a floor of a cargo area of the stationary vehicle.

18. The seat structure support method of claim 16, where the at least one hinge assembly pivotably couples a liftgate to a body of the stationary vehicle.

19. The seat structure support method of claim 18, wherein the liftgate is a split liftgate.

* * * * *